United States Patent
Fujita et al.

(10) Patent No.: US 9,909,036 B2
(45) Date of Patent: Mar. 6, 2018

(54) PRESSURE-SENSITIVE ADHESIVE COMPOSITION AND PRESSURE-SENSITIVE ADHESIVE TAPE

(71) Applicant: 3M INNOVATIVE PROPERTIES COMPANY, St. Paul, MN (US)

(72) Inventors: Jun Fujita, Tokyo (JP); Yorinobu Takamatsu, Sagamihara (JP); Sawako Kojima, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/298,022

(22) Filed: Oct. 19, 2016

(65) Prior Publication Data

US 2017/0037284 A1 Feb. 9, 2017

Related U.S. Application Data

(62) Division of application No. 12/994,261, filed as application No. PCT/US2009/040619 on Apr. 15, 2009, now Pat. No. 9,487,676.

(30) Foreign Application Priority Data

Jun. 2, 2008 (JP) .................................. 2008-145077

(51) Int. Cl.
*C09J 7/04* (2006.01)
*C09J 133/08* (2006.01)
(Continued)

(52) U.S. Cl.
CPC ............. *C09J 7/045* (2013.01); *C08F 220/18* (2013.01); *C08J 3/245* (2013.01); *C09J 4/00* (2013.01);
(Continued)

(58) Field of Classification Search
None
See application file for complete search history.

(56) References Cited

U.S. PATENT DOCUMENTS 4,737,559 A 4/1988 Kellen et al.
5,055,504 A 10/1991 Mahil et al.
(Continued)

FOREIGN PATENT DOCUMENTS

EP 1 371 705 12/2003
JP H02-110183 4/1990
(Continued)

OTHER PUBLICATIONS

PCT/US2009/040619 International Search Report dated Nov. 10, 2009.
(Continued)

*Primary Examiner* — Frank D Ducheneaux
(74) *Attorney, Agent, or Firm* — Sandra K. Nowak (57) ABSTRACT

A pressure-sensitive adhesive composition is disclosed. The composition comprises a particulate polymer of a monomer mixture comprising (a) an alkyl (meth)acrylate monomer; (b) at least one of (b-1) an alkyl (meth)acrylate monomer with the alkyl group having a carbon number of 15 to 24 and the alkyl group being a linear alkyl group and (b-2) an alkyl (meth)acrylate monomer with the alkyl group having a carbon number of 15 to 24 and the alkyl group being a branched alkyl group; and (c) a monoolefinically unsaturated monomer having a ketone group with the alkyl group having a carbon number of 8 to 14. Pressure sensitive adhesive tapes incorporating such adhesive compositions are also described.

11 Claims, 1 Drawing Sheet

(51) Int. Cl.
  *C08L 33/08*    (2006.01)
  *C09J 129/12*   (2006.01)
  *C08F 220/18*   (2006.01)
  *C08F 220/26*   (2006.01)
  *C08F 220/58*   (2006.01)
  *C08J 3/24*     (2006.01)
  *C09J 4/00*     (2006.01)
  *C08L 29/12*    (2006.01)
  *C08F 220/06*   (2006.01)

(52) U.S. Cl.
  CPC .......... *C09J 133/08* (2013.01); *C08F 220/06* (2013.01); *C08F 220/26* (2013.01); *C08F 220/58* (2013.01); *C08F 2220/1841* (2013.01); *C08F 2220/1891* (2013.01); *C08J 2333/08* (2013.01); *C08L 29/12* (2013.01); *C08L 33/08* (2013.01); *C09J 129/12* (2013.01); *C09J 2400/283* (2013.01); *C09J 2433/00* (2013.01); *Y10T 428/2891* (2015.01)

(56) References Cited

U.S. PATENT DOCUMENTS

| | | | |
|---|---|---|---|
| 5,648,425 A | 7/1997 | Everaerts et al. | |
| 5,663,241 A | 9/1997 | Takamatsu et al. | |
| 5,741,543 A | 4/1998 | Winslow et al. | |
| 6,190,767 B1 | 2/2001 | Ishikawa et al. | |
| 6,221,454 B1 | 4/2001 | Saito et al. | |
| 6,605,662 B2 * | 8/2003 | Zhao | C08F 265/06 523/201 |
| 6,686,413 B2 | 2/2004 | Nakamura et al. | |
| 7,070,051 B2 | 7/2006 | Kanner | |
| 2003/0055156 A1 | 3/2003 | Cabrera | |
| 2003/0118770 A1 | 6/2003 | Suwa et al. | |
| 2005/0196609 A1 | 9/2005 | Husemann | |
| 2006/0240257 A1 | 10/2006 | Schwantes et al. | |

FOREIGN PATENT DOCUMENTS

| | | |
|---|---|---|
| JP | 6-192341 | 7/1994 |
| JP | 6-346039 | 12/1994 |
| JP | H06-340851 | 12/1994 |
| JP | 7-502560 | 3/1995 |
| JP | 8-325544 | 12/1996 |
| JP | 9-505103 | 5/1997 |
| JP | H09-324164 | 12/1997 |
| JP | 10-511126 | 10/1998 |
| JP | 2007-131857 | 5/2007 |
| JP | 2009-074083 | 4/2009 |
| WO | WO 93/13147 | 7/1993 |
| WO | WO 1993/13148 | 7/1993 |
| WO | WO 1995/13331 | 5/1995 |
| WO | WO 1996/18701 | 6/1996 |
| WO | WO 2001/83585 | 11/2001 |
| WO | WO 2006/104097 | 10/2006 |

OTHER PUBLICATIONS

EP Extended Search Report, EP09767168.9, dated Dec. 27, 2012, 5 pages.

* cited by examiner

PRESSURE-SENSITIVE ADHESIVE COMPOSITION AND PRESSURE-SENSITIVE ADHESIVE TAPE

CROSS REFERENCE TO RELATED APPLICATIONS

This application is a divisional application of U.S. application Ser. No. 12/994,261, filed Nov. 23, 2010, now U.S. Pat. No. 9,487,676, which was a national stage filing under 35 U.S.C. 371 of PCT/US2009/040619, filed Apr. 15, 2009, which claims priority to Japanese Application No. 2008-145077, filed Jun. 2, 2008, the disclosure of which is incorporated by reference in their entirety herein.

FIELD

This disclosure relates to a pressure-sensitive adhesive composition and a pressure-sensitive adhesive tape using the composition.

BACKGROUND

A pressure-sensitive adhesive exhibiting excellent tack property at low temperatures and ensuring sufficiently high cohesive force and holding force is demanded in the field of pressure-sensitive adhesive tapes, particularly, a masking tape for sealing in the architectural field. The sealing operation includes the steps of (1) applying a masking tape to a site intended to be prevented from contamination by a sealing material, (2) coating a primer for sealing materials, (3) coating a sealing material, and (4) after drying or curing the sealing material, peeling off the masking tape.

As regards the masking tape for sealing, an acrylic pressure-sensitive adhesive is being studied, and the following acrylic pressure sensitive adhesives are known.

Patent Document 1 (Kokai (Japanese Unexamined Patent Publication) No. 6-346039) describes "a pressure-sensitive adhesive composition, which is an aqueous emulsion pressure-sensitive adhesive composition, comprising (A) a polymer obtained by the polymerization of monomers containing (1) 100 parts by weight of an acrylate monomer and (2) from 0.1 to 5 parts by weight of a carbonyl group-containing monomer, the polymer having a glass transition point of −75 to −45° C., and a storage modulus of $1\times10^5$ to $4\times10^5$ dyn/cm$^2$; and (B) a polyfunctional hydrazide compound in an amount of 0.02 to 0.5 mol per mol of the carbonyl group in the carbonyl group-containing monomer of (2)". In Patent Document 1, the alkyl group of the acrylate monomer is specified to have a carbon number of 9 or less.

Patent Document 2 (Kohyo (National Publication of Translated Version) No. 7-502560) describes "an acrylic pressure-sensitive adhesive, which substantially exhibits self-adhesive property, comprising: (a) from 10 to 50 wt % of a higher alkyl acrylate with the alkyl group having a carbon number of 12 to 26, (b) from 50 to 90 wt % of a lower alkyl acrylate with the alkyl group having a carbon number of 4 to 12, (c) at least one kind of a polar monomer copolymerizable with the higher alkyl acrylate and lower alkyl acrylate, and (d) a crosslinking agent in an amount sufficiently large to endow the adhesive with satisfactory cohesive strength for preventing substantial migration of the adhesive". The crosslinking agents set forth includes a polyfunctional acrylate, a polyfunctional methacrylate, a chromophore-substituted halomethyl-S-triazine, benzophenone, acetophenone, silane, a monoethylenically unsaturated aromatic ketone, and a combination thereof. Photo-crosslinking is caused in the melt-coating type pressure-sensitive adhesive, whereby the cohesive force of the pressure-sensitive adhesive is enhanced and the resistance to migration into the adherend is improved.

Patent Document 3 (Kohyo No. 9-505103) describes "a pressure-sensitive adhesive comprising a reaction product of a starting substance containing (a) from 25 to 97 parts by weight of an acrylic acid ester of monovalent alcohol, of which homopolymer has Tg of less than 0° C., (b) from 3 to 75 parts by weight of a nonpolar ethylenically unsaturated monomer, of which homopolymer has a dissolution parameter of not more than 10.50 and Tg of more than 15° C., and (c) from 0 to 5 parts by weight of a polar ethylenically unsaturated monomer, of which homopolymer has a dissolution parameter of more than 10.50 and Tg of more than 15° C., wherein the relative amounts of the acrylic acid ester, nonpolar ethylenically unsaturated monomer and polar ethylenically unsaturated monomer are selected such that the reaction product after being allowed to stand at room temperature for 72 hours has a 90° peel adhesive force of at least 2 pounds/0.5 inches for a polypropylene surface".

Patent Document 4 (Kohyo No. 10-511126) describes "a removable pressure-sensitive adhesive comprising: (a) a pressure-sensitive adhesive particle which is a suspension polymerization product of (1) a monoolefinically unsaturated monomer having an aldehyde group or a ketone group, (2) a base monomer selected from the group consisting of an alkyl (meth)acrylate ester with the alkyl group having a carbon number of 4 to 14, a vinyl ester and a mixture thereof, and (3) an initiator soluble in oil; and (b) a polyhydrazide crosslinking agent for crosslinking the adhesive fine particles with each other".

Patent Document 5 (Kokai No. 2007-131857) describes "a pressure-sensitive adhesive composition for surface protective film, which is a pressure-sensitive adhesive composition comprising 100 parts by weight of an acrylically copolymer containing the following components (a) to (d) and from 0.1 to 5 parts by weight of a crosslinking agent: (a) from 65 to 98.4 mass % of an acrylic acid alkyl ester with the alkyl group having a carbon number of 1 to 9, (b) from 0.5 to 5 mass % of a copolymerizable unsaturated monomer containing a hydroxyl group and/or a carboxyl group, (c) from 1 to 20 mass % of a (meth)acrylic acid alkyl ester with the alkyl group having a carbon number of 16 to 22, and (d) from 0.1 to 5 mass % of a reactive emulsifier, wherein the self-adhesive force for a stainless steel sheet 20 minutes after applying the composition at 25° C. is 50 g/inch or less, the self-adhesive force after applying and then heating the composition at 95° C. for 4 hours is 150 g/inch or less, and the surface resistance value of the glue face when coated on a polyester film substrate is 1,011Ω or less".

Patent Document 6 (Kokai No. 8-325544) describes "a removable pressure-sensitive adhesive comprising a copolymer of a monomer mixture of (A) an acrylate monomer comprising a (meth)acrylic acid alkyl ester with the alkyl group having a carbon number of 14 to 22 and being branched, (B) an acrylate monomer represented by the formula: CH=CR$^1$COOR" (wherein R$^1$ is hydrogen or a methyl group, and R "is a hydrocarbon or substituted hydrocarbon group having a carbon number of 4 to 8), and (C) a vinyl monomer copolymerizable with the components A and B, the component A being from 30 to 90 wt %, the component B+the component C being from 70 to 10 wt %, the component B being from 60 to 0 wt %, and the component C being from 40 to 0 wt %". Patent Document 7 describes a technique of obtaining a removable pressure-sensitive adhesive by emulsion polymerization.

DESCRIPTION OF NUMERICAL REFERENCES

1 Substrate
2 Concrete board
3 Backup material
4 Masking tape
5 Primer
6 Sealing material

DISCLOSURE

Problems to be Solved

An acrylic pressure-sensitive adhesive having excellent weather resistance and leaves no adhesion mark after it is used as a masking tape because it exhibits excellent self-adhesive performance even without containing a tackifier or a plasticizer. In particular, a particulate pressure-sensitive adhesive having a large cohesive force and is being widely used in the above application. However, since the adhesive force of the acrylic pressure-sensitive adhesive is enhanced by a primer for a sealing material, the following problem may occur. If a surface to be masked has a rough surface or porous surface such as motor, when a masking tape having an acrylic pressure-sensitive adhesive layer on a substrate is attached to the rough surface or porous surface, a gap is formed between the surface and the masking tape. Then, a primer for a sealing material is applied on the tape, the primer penetrates into the gap from the edge portion of the tape, as a result, the adhesion force of the pressure-sensitive adhesive to the above surface is enhanced, and thus the substrate of the masking tape may be ruptured during removal of the tape.

In order to enhance the resistance in the primer treatment, it may be considered to apply crosslinking to an acrylic polymer constituting the acrylic pressure-sensitive adhesive. However, if the crosslinking is fully affected to obtain a sufficiently high resistance to the primer, the glass transition point and storage modulus of the polymer are increased, giving rise to a reduction in the low-temperature tack property. An acrylic pressure-sensitive adhesive satisfying both satisfactory tack property and sufficiently high resistance to the primer is being demanded.

In one embodiment, this disclosure provides a pressure-sensitive adhesive composition comprising a particulate polymer of a monomer mixture comprising:
(a) from 45 to 79.5 mass % of an alkyl (meth)acrylate monomer with the alkyl group having a carbon number of 8 to 14,
(b-1) from 20 to 50 mass % of an alkyl (meth)acrylate monomer with the alkyl group having a carbon number of 15 to 24 and the alkyl group being a linear alkyl group (i.e., a linear-alkyl (meth)acrylate), and
(c) from 0.5 to 5 mass % of a monoolefinically unsaturated monomer having a ketone group;
wherein the percentages are based on the total amount of the monomers (a), (b-1) and (c).

In another embodiment, this disclosure provides a pressure-sensitive adhesive composition comprising a particulate polymer of a monomer mixture comprising:
(a) from 0 to 79.5 mass % of an alkyl (meth)acrylate monomer with the alkyl group having a carbon number of 8 to 14,
(b-2) from 20 to 99.5 mass % of an alkyl (meth)acrylate monomer with the alkyl group having a carbon number of 15 to 24 and the alkyl group being a branched alkyl group (i.e., a branched-alkyl (meth)acrylate), and
(c) from 0.5 to 5 mass % of a monoolefinically unsaturated monomer having a ketone group;
wherein the percentages are based on the total amount of the monomers (a), (b-2) and (c).

In still another embodiment, this disclosure provides a pressure-sensitive adhesive composition comprising a particulate polymer of a monomer mixture comprising:
(a) from 0 to 79.5 mass % of an alkyl (meth)acrylate monomer with the alkyl group having a carbon number of 8 to 14,
(b) from 20 to 99.5 mass % of a mixture of (b-1) a linear-alkyl (meth)acrylate monomer with the alkyl group having a carbon number of 15 to 24 and the alkyl group being a linear alkyl group and (b-2) a branched-alkyl (meth)acrylate monomer with the alkyl group having a carbon number of 15 to 24 and the alkyl group being a branched alkyl group, and
(c) from 0.5 to 5 mass % of a monoolefinically unsaturated monomer having a ketone group;
wherein the percentages are based on the total amount of the monomers (a), (b-1), (b-2), and (c); and the monomer (b-1) accounts for 0 to 50 mass % of the mixture of (b-1) and (b-2).

In yet still another embodiment, this disclosure provides a pressure-sensitive adhesive composition further comprising a crosslinking agent; a substrate; and a pressure-sensitive adhesive tape having a layer of the above-described pressure-sensitive adhesive composition on the substrate.

The pressure-sensitive adhesive constructed as above has not only satisfactory tack property even at low temperatures but also resistance to the primer treatment. The masking tape having a layer of this pressure-sensitive adhesive ensures that at the sealing operation, particularly, at the sealing operation in the architectural field, even when the masking tape is adhered to an adherent and a primer treatment is performed, the pressure-sensitive adhesive is prevented from occurrence of a significant increase in the adhesive force to the adherent and the masking tape can be easily removed after the operation.

The pressure-sensitive adhesive composition of this disclosure comprises a particulate polymer, and the particulate polymer is a particulate polymer of a monomer mixture comprising (a) an alkyl (meth)acrylate monomer with the alkyl group having a carbon number of 8 to 14, (b) an alkyl (meth)acrylate monomer with the alkyl group having a carbon number of 15 to 24, and (c) a monoolefinically unsaturated monomer having a ketone group.

The monomer (a) can control the glass transition temperature (Tg) of the polymer and impart desirable easy releasability to the pressure-sensitive adhesive composition. The monomer (a) includes an alkyl group-containing (meth)acrylate such as 2-ethylhexyl (meth)acrylate, isooctyl (meth)acrylate, isononyl (meth)acrylate, isodecyl (meth)acrylate, isododecyl (meth)acrylate, lauryl (meth)acrylate, isotridecyl (meth)acrylate and isomyristyl (meth)acrylate. Also, this monomer may be an alicyclic (meth)acrylate such as isobornyl (meth)acrylate and dicyclopentanyl (meth)acrylate. The monomer is preferably 2-ethylhexyl (meth)acrylate, isooctyl (meth)acrylate, isononyl (meth)acrylate, isodecyl (meth)acrylate or isobornyl (meth)acrylate, more preferably 2-ethylhexyl (meth)acrylate.

The monomer (b) has a low polarity and can suppress swelling by the primer and improve the resistance to the primer. This monomer can also lower the modulus of the polymer and impart tack property to the pressure-sensitive adhesive composition. Examples of the monomer (b) include (b-1) linear alkyl group-containing (meth)acrylates such as cetyl (meth)acrylate (n-C16), stearyl (meth)acrylate (n-C18), aralkyl (meth)acrylate (n-C20) and behenyl (meth)acrylate (n-C22), and (b-2) branched alkyl group-containing (meth)acrylates such as isocetyl (meth)acrylate (iso-C16), isostearyl (meth)acrylate (iso-C18) and 2-octyldodecanyl (meth)acrylate (iso-C20). The linear alkyl group-containing (meth)acrylate is preferably cetyl (meth)acrylate (n-C16) or stearyl (meth)acrylate (n-C18), and the branched alkyl group-containing (meth)acrylate is preferably isocetyl (meth)acrylate (iso-C16) or isostearyl (meth)acrylate (iso-C18). The monomer is more preferably stearyl (meth)acrylate (n-C18).

The monomer (c) can contribute to the stability of the polymer obtained by suspension polymerization of monomers and the cohesive force of the pressure-sensitive adhesive composition. The monoolefinically unsaturated functional group in the monomer (c) may be a (meth)acrylate, a (meth)acrylamide, a styryl group or other vinyl functional group. Examples of the monomer (c) include diacetone (meth)acrylamide, acryloylbenzophenone, acrolein, vinyl methyl ketone, vinyl ethyl ketone and vinyl isobutyl ketone. The monomer is preferably diacetone (meth)acrylamide. Such a ketone group-containing monomer can be crosslinked by a polyfunctional hydrazide described later and is accordingly inactive in an aqueous suspension, and when the water content is removed, an inter-particle crosslink can be formed between particles in a short time.

As the monomer mass percentages are reported based on the total mass of monomers (a), (b), and (c), the total mass of the monomers (a), (b) and (c) is 100 mass %. The blending ratios of the monomer (a), (b), and (c) in the following three cases are separately described below.

(I) In the case where the monomer (b) is a monomer (b-1) (linear alkyl (meth)acrylate); the polymer obtained has crystallinity and therefore, swelling due to a solvent scarcely occurs, which is preferred in view of resistance to the primer. In this case, the amounts in which the monomers can be used are from 45 to 79.5 mass % of the monomer (a), 20 to 50 mass % of the monomer (b-1) and from 0.5 to 5 mass % of the monomer (c), preferably from 59 to 74 mass % of the monomer (a), from 25 to 40 mass % of the monomer (b-1) and from 1 to 3 mass % of the monomer (c). If the amount of the monomer (a) is less than 45 mass %, satisfactory tack property cannot be obtained at low temperatures, whereas if it exceeds 79.5 mass %, the resistance to the primer deteriorates. If the amount of the monomer (b-1) is less than 20 mass %, the resistance to the primer deteriorates, whereas if it exceeds 50 mass %, the tack of the pressure-sensitive adhesive composition at low temperature sometimes becomes insufficient due to crystallization and resultant elevation in the modulus. Also, if the amount of the monomer (c) is less than 0.5 mass %, an insufficient effect is produced by the addition, whereas if it exceeds 5 mass %, the adhesive force excessively rises and at the separation after use, an excessively high peel force is required.

(II) In the case where the monomer (b) is a monomer (b-2) (branched alkyl (meth)acrylate), monomer (b) is an alkyl (meth)acrylate having a branched alkyl group, and the effect of lowering the polarity of the polymer is equal to that in having a linear alkyl group and by virtue of no crystallinity, the modulus can be decreased to enable obtaining satisfactory tack. For this reason, the monomer (a) need not be necessarily contained. Therefore, in this case, the amounts in which the monomers can be used are from 0 to 79.5 mass % of the monomer (a), from 20 to 99.5 mass % of the monomer (b-2), and from 0.5 to 5 mass % of the monomer (c). In a preferred formulation, the amounts in which the monomers can be used are from 18 to 68 mass % of the monomer (a), from 30 to 80 mass % of the monomer (b-2), and from 2 to 5 mass % of the monomer (c). If the amount of the monomer (a) exceeds 79.5 mass %, the resistance to the primer decreases. If the amount of the monomer (b-2) is less than 20 mass %, the amount of the monomer (a) relatively increases and therefore, the resistance to the primer deteriorates. The amount of the monomer (c) can be set to a range of 0.5 to 5 mass % because of the same reasons as in (I).

(III) In the case where the monomer (b) contains a monomer (b-1) (linear alkyl (meth)acrylate) and a monomer (b-2) (alkyl (meth)acrylate having a branched alkyl group), the amounts in which the monomers can be used are from 0 to 79.5 mass % of the monomer (a), from 20 to 99.5 mass % of the monomer (b) (where the amount of the monomer (b-1) is from 0 to 50 mass % based on the total mass of the monomers (b-1) and (b-2)), and from 0.5 to 5 mass % of the monomer (c). The amount of each monomer is in the above-described range because of the same reasons as in (I) and (II). The percentages in which the monomers can be used are preferably from 20 to 55 mass % of the monomer (a), from 20 to 35 mass % of the monomer (b-1), from 5 to 35 mass % of the monomer (b-2), and from 2 to 5 mass % of the monomer (c).

In this disclosure, the particulate polymer contained in the pressure-sensitive adhesive composition can be obtained by polymerizing a monomer mixture containing the monomers (a), (b) and (c) in water. A useful initiator is an initiator being suitable for suspension radical polymerization of a (meth)acrylate or vinyl ester monomer and soluble in oil and having very low solubility in water, which is generally 1 g per 100 g of water at 20° C. Examples of such an initiator include an azo compound, hydroperoxide, peroxide, benzophenone or benzoin ethyl ether, and 2,2-dimethoxy-2-phenylacetophenone. The initiator is used in an amount of generally from about 0.01 to 2 mass %, preferably from 0.05 to 1 mass %.

The particle diameter of the particulate polymer obtained by the above-described polymerization is from 0.1 to 20 microns, preferably from 0.5 to 10 microns. If the particle diameter is less than 0.1 microns or exceeds 20 microns, poor dispersion stability of particles sometimes results.

The pressure-sensitive adhesive composition of this disclosure may contain a small amount of a monomer other than the monomers (a), (b) and (c). For example, a polyfunctional crosslinking agent monomer may be used. This monomer is a crosslinking agent having two or more radical polymerizable olefinically unsaturated groups. By virtue of adding such a polyfunctional monomer at the polymerization, a polymer which is crosslinked inside of the particle can be obtained (hereinafter, this crosslinking agent is referred to as an "internal crosslinking agent"). The useful polyfunctional crosslinking agent include a (meth)acrylic acid ester of diol (e.g., 1,4-butanediol di(meth)acrylate, 1,6-hexanediol di(meth)acrylate), a (meth)acrylic acid ester of triol (e.g., glycerol), a (meth)acrylic acid ester of tetrol (e.g., pentaerythritol), a polymer functional (meth)acrylate (e.g., poly(ethylene oxide) diacrylate, poly(ethylene oxide) dimethacrylate), a polyvinyl compound (e.g., substituted or unsubstituted divinylbenzene), a bifunctional urethane acrylate, and a mixture thereof. The internal crosslinking agent forms a crosslink in the inside of the particle and therefore, can enhance the cohesive force of the particle itself. This crosslinking agent can also reduce swelling by the primer and therefore, is preferred in view of resistance to the primer. In the case of using an internal crosslinking agent, the crosslinking agent is used in a concentration of generally from 0.01 to 0.5 mass %, preferably from 0.01 to 0.1 mass %, based on the total mass of monomers. If the concentration is less than 0.01 mass %, a sufficiently high effect cannot be obtained, whereas if it exceeds 0.5 mass %, the storage modulus of the polymer particle increases, as a result, tack may not be felt on touching at room temperature.

Furthermore, a polyfunctional hydrazide may be used as a crosslinking agent for bringing about crosslinking between suspension polymerization polymer particles described above (hereinafter, this crosslinking agent is referred to as an "external crosslinking agent"). The polyfunctional hydrazide is considered to be substantially non-reactive with a polymer particle in an aqueous suspension. However, when the water content is removed from the aqueous suspension by drying, a dehydration condensation reaction takes places between a carbonyl group produced in the particle from the carbonyl group-containing monomer and a hydrazino species. In a preferred system, this reaction proceeds at a high rate under the ambient conditions and a covalent bond is formed between particles. In this way, the pressure-sensitive adhesive particle is regarded as being crosslinked between particles, that is, externally crosslinked. The polyfunctional hydrazide not only is inactive in an aqueous suspension but also can form an inter-particle covalent crosslink between particles in a short time when the water content is removed, and therefore, this crosslinking agent is useful. By applying inter-particle crosslinking in this way, coming off of a particle from the pressure-sensitive adhesive can be prevented and glue residue may less occur. Useful examples of the polyfunctional hydrazide include oxalyl dihydrazide, malonyl dihyrazide, succinyl dihydrazide, glutaryl dihydrazide, adipoyl dihydrazide (ADH), maleyl dihydrazide, sebacoyl dihydrazide, dodecanediohydrazide, 7,11-octadecadiene-1,18-dicarbohydrazide, fumaroyl dihydrazide, isophthalic dihydrazide, terephthalic dihydrazide, aminopolyacrylamide, 1,3-bis(hydrazinocarbonoethyl)-5-isopropylhydantoin (VDH), and a mixture thereof. Among these polyfunctional hydrazides, 1,3-bis(hydrazinocarboethyl)-5-isopropylhydatoin (VDH) and adipoyl dihydrazide are preferred. The polyfunctional hydrazide is used in an amount of generally from 0.01 to 0.5 mass %, preferably from 0.01 to 0.1 mass %, based on the mass of pressure-sensitive adhesive particle comprising a suspension polymerization polymer. If the amount used is less than 0.01 mass %, a sufficiently high effect is not obtained, whereas if it exceeds 0.5 mass %, the storage modulus of the polymer particle increases, as a result, tack may not be felt on touching at room temperature.

The molecular weight of the particulate acrylic polymer can be discussed using, as an index, the value of loss factor (tan δ) which is a ratio between storage modulus and loss modulus in the rubbery elastic region. Specifically, when the tan δ value at 100° C. is 0.3 or more, the molecular weight is small as the pressure-sensitive adhesive for masking tapes and accordingly, the cohesive force is poor, which may give rise to glue residue. In the case when the value is 0.1 or less, the flowability of the pressure-sensitive adhesive composition is poor and a sufficiently high initial adhesive force may not be obtained. Incidentally, the storage modulus and loss modulus are measured by the methods described in Examples.

The pressure-sensitive adhesive composition of this disclosure can be obtained by removing the water content from the polymer after suspension polymerization. The pressure-sensitive adhesive composition is coated on various filmy substrates according to the adhesion target and then dried, whereby the composition can be used as a removable pressure-sensitive adhesive tape, particularly, as a masking tape. Examples of the material for the substrate of the tape include paper, polypropylene, polyethylene, polyester, vinyl chloride resin, cellulose acetate, polyacetate, ethylene vinyl acetate copolymer (EVA), polyamide, polyimide, polymethylpentene and cotton, and one of these materials or a mixture thereof may be used.

Particularly, in use as a sealing material for architecture, the substrate is preferably paper, more preferably Japanese paper. The "Japanese paper" as used herein usually means paper obtained through mechanical papermaking using a shaking and scooping process. The Japanese paper may be one treated with a general-purpose treating agent. For example, Japanese paper subjected to hole filling for preventing the pressure-sensitive adhesive from penetrating to the back at the coating of the pressure-sensitive adhesive, or to impregnation, for example, for adjusting the substrate strength or improving the internal strength of the substrate, may be used.

The base paper of Japanese paper is preferably paper using Kraft pulp as the main raw material. Other than the Kraft paper, for the purpose of improving the mechanical strength or water resistance, a fiber capable of papermaking, such as polyester fiber, vinylon fiber and Manila hemp, may be used in combination. In Japanese paper, a paper strength reinforcing agent such as polyvinyl alcohol and polyacrylamide may be added as a binder. Examples of the impregnant used for the impregnation of Japanese paper include an aqueous treating agent such as synthetic rubber latex (e.g., styrene-butadiene rubber (SBR), methyl methacrylate-butadiene rubber (MBR), acrylonitrile-butadiene rubber (NBR)), natural rubber (NR) latex, polyvinyl chloride (PVC) emulsion and acryl emulsion; and a single substance or a blend of a synthetic rubber such as solvent-soluble styrene-butadiene rubber (SBR), acrylonitrile-butadiene rubber (NBR), isoprene rubber (IR), styrene-isoprene-styrene rubber (SIS), styrene-butadiene-styrene rubber (SBS) and styrene-ethylene-butylene-styrene rubber (SEBS), a natural rubber and an acryl polymer. These polymers and mixtures thereof are suitable because of their appropriate flexibility at low temperatures, low cost, appropriate tearing strength and no involving of breakage of the substrate at the re-releasing.

In this disclosure, the thickness of the substrate is preferably from 10 to 200 microns (μm). If the thickness is less than 10 μm, the substrate becomes less elastic and difficult to handle and also comes to have poor mechanical strength, making it difficult to produce a pressure-sensitive adhesive tape, whereas if the thickness exceeds 200 μm, the thickness of the entire pressure-sensitive adhesive tape becomes large and this incurs poor handleability or reduction of creep resistance. Furthermore, in view of good balance among adhesive force, creep resistance and handleability, the thickness of the substrate is more preferably from 50 to 150 μm and most preferably from 75 to 120 μm.

In the application to masking for architectural sealing or masking for painting, the tape is applied to an adherend having a complicated shape, a curved surface, an irregular surface or the like and therefore, the operation of applying the tape can be hardly mechanized and is often made by hand still at present. Accordingly, the tape needs to be easily cut by hand in use and also is required not to be ruptured when separating the tape. The tape substrate preferably has a tensile strength in the longitudinal direction of 20 to 30 N/cm, a tear strength in the longitudinal direction of 0.3 to 0.5 N, a tensile strength in the transverse direction of 8 to 15 N/cm, and a tear strength in the transverse direction of 0.5 to 0.7 N.

In the case of withdrawing the masking tape of this disclosure in use, in order to allow for smooth withdrawing, the above-described substrate preferably further has a release treatment layer on the outermost surface. The release treatment layer can be formed using an ordinary method such as covering method and coating method to an arbitrary thickness suitable for each pressure-sensitive adhesive tape. For example, a long chain alkyl group-containing (meth) acrylic resin layer, a fluorine-based synthetic resin layer, or a coating of a silicone-based release agent is appropriately used as the release treatment layer.

In order to enhance the adhesive property to the pressure-sensitive adhesive composition, a corona treatment, a primary treatment, a matting treatment or the like is preferably applied to the substrate.

The thickness of the pressure-sensitive adhesive layer may be widely varied according to the kind or usage of the masking tape, but usually, the thickness is preferably from about 3 to 150 μm, more preferably from about 10 to 100 μm. If the thickness of the pressure-sensitive adhesive layer is less than 3 μm, the adhesive force becomes insufficient and the tape applied lifts up, whereas if the thickness of the pressure-sensitive adhesive layer exceeds 150 μm, the tape can be hardly separated at the re-releasing and this may incur bad operability or breakage when separating the tape.

The method of coating the pressure-sensitive adhesive composition is a method of coating a polymer suspension obtained through suspension polymerization, for example, by kiss coating with a round bar or a Meyer bar, gravure coating, knife coating, air knife coating, comma coating, reverse coating, comma reverse coating, lip coating, Ultra Die coating or gear die coating.

The pressure-sensitive adhesive composition of this disclosure has resistance to a primer treatment as well as satisfactory tack property. Therefore, a pressure-sensitive adhesive tape having a layer of this pressure-sensitive adhesive composition on a substrate is useful as a masking tape for sealing operation where a primer treatment needs to be applied. In particular, when the adherend surface to which the masking tape is adhered is uneven or the adherend surface is porous, a gap is created between the adherend and the pressure-sensitive adhesive layer of the masking tape, and the primer readily penetrates therebetween. The primer promotes wet spreading of the pressure-sensitive adhesive or the solvent of the primer swells the pressure-sensitive adhesive, as a result, the pressure-sensitive adhesive firmly adheres to the uneven surface. However, such a phenomenon does not occur with the pressure-sensitive adhesive composition of this disclosure. More specifically, by virtue of satisfactory resistance to the primer, even in the case of such an adherend, a significant increase of the adhesive force is not observed and the tape can be easily removed from the adherend after use.

Figure 1A:
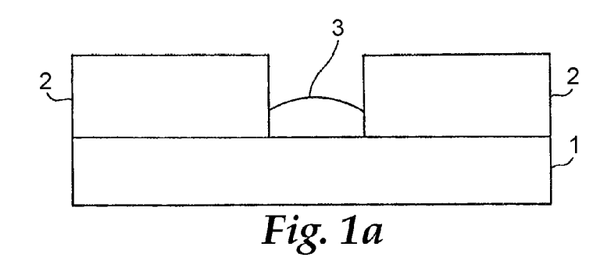
FIG. 1a-1f illustrate the sequential steps in an exemplary method for sealing of a concrete board, where a masking tape in one embodiment of this disclosure is used.
Figure 1B:
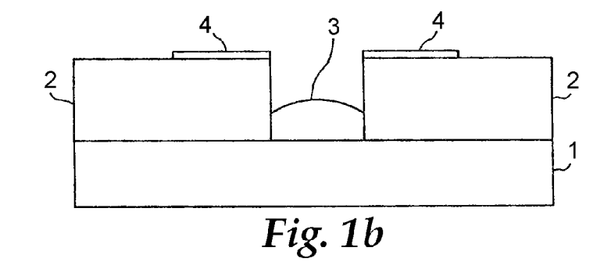
Figure 1C:
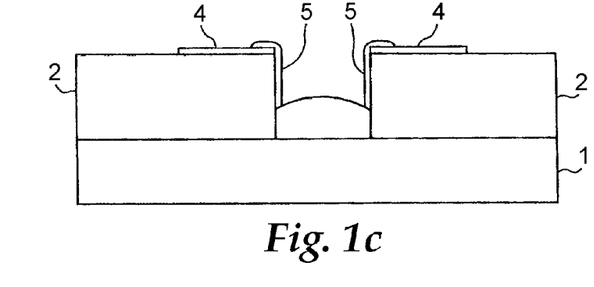
Figure 1D:
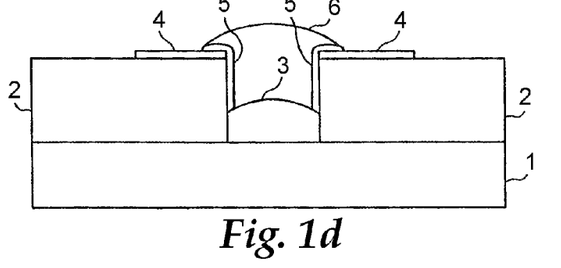
Figure 1E:
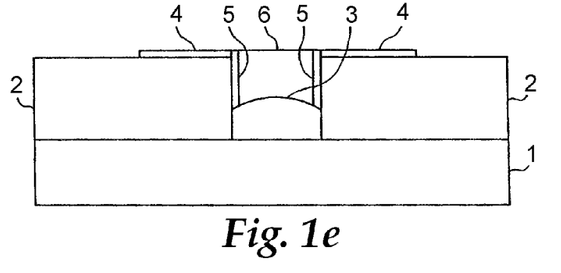
Figure 1F:
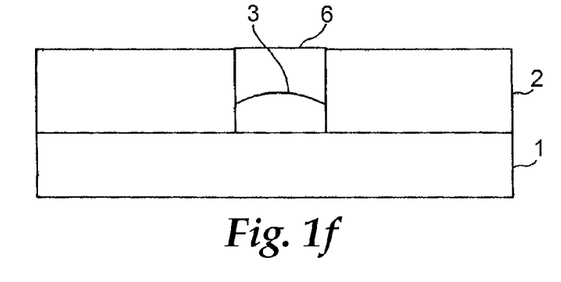

FIGS. 1a-1f are sequential views showing the process in the sealing method of a concrete board in the architectural use, where the masking tape of this disclosure is used. First, in a wall comprising substrate 1 having disposed thereon a concrete board 2, a backup material 3 is inserted into the joint formed between the substrate 1 and the concrete board (step a). Next, a masking tape 4 is adhered along the edge part of the exposed surface of the concrete board 2 (step b). Furthermore, for enhancing the adhesive property of a sealing material 6 to the concrete board 2, a primer 5 is coated on the side surface of the concrete board 2 by using appropriate means such as brush (step c). Subsequently, a sealing material 6 is filled using appropriate means such as sealing gun (step d). After the filling, the sealing material 6 is pressed using a spatula and made smooth (step e). Finally, when the sealing material 6 loses tack after the passing of a predetermined time, the masking tape 4 is separated.

The backup material 3 is used for not allowing adhesion of three surfaces, that is, right and left surfaces of the concrete board 2 and exposed surface of the substrate 1. If the sealing material is adhered to three surfaces, cracking sometimes occurs to impair the seal, because the sealing material cannot freely follow the telescopic motion of the joint. The backup material also provides for such effects as that the exchange of sealing is facilitated and a more expensive sealing material can be saved. The requirements required of the backup material are to have a small adhesive force to the sealing material and be moisture-proof, able to endure the telescopic motion and inexpensive. Usually, a polyethylene-made foam is used.

As regards the sealing material 6, the requirements required of the architectural sealing material are to be excellent in the moisture-proofing, able to endure the expansion/contraction motion, and assured of excellent weather resistance. Examples of the material type include a silicone type, a modified silicone type, a polyurethane type, a polysulfide type, an acrylic type, and a synthetic rubber type. Also, there are a one-component type and a two-component type, and each type includes a moisture curing type, a dry curing emulsion type, a dye curing solvent type, a reaction curing type and the like. In many cases, a moisture curing type or a reaction curing type is used because of a short application time and a small environmental load. Typical reactions are shown below.

Moisture Curing (Silicone Type):

1) An alkoxy group reacts with water to form a hydroxysilyl group.
2) The hydroxysilyl group undergoes a dehydration reaction to form an Si—O—Si bond, thereby effecting curing.

Moisture Curing (Urethane Type):

1) An isocyanate group reacts with water to form an amino group.
2) The isocyanate group then reacts with the amino group to form a urea bond, thereby effecting curing.

Two-Component Reaction Curing:

A hydroxyl group in the sealing material reacts with an isocyanate group to form a urethane bond, thereby effecting curing.

The architectural sealing material is weathered and also stressed due to thermal expansion or vibration and therefore, is separated at the interface in many cases. For this reason, a primer is very often used when using a sealing material. The primer is used for firmly adhering the sealing material to a body member such as concrete, mortar or siding board and when coated, penetrates into an adherend to form an easy adhesion film. In general, a resin containing a functional group having a large interaction with the components of the sealing material is used after diluting it with a solvent, and examples thereof include those mainly comprising an isocyanate group-containing polyurethane resin or a silane coupling agent and being diluted with a solvent such as ethyl acetate. As for the polyisocyanate compound, a compound obtained by the addition reaction between an isocyanate compound and a polyol such as polyethylene glycol is known. As for the silane coupling agent, a coupling agent having an amino group, an epoxy group, a mercapto group and an isocyanate group is generally used. The isocyanate group reacts with a hydroxyl group, a carboxyl group, an amino group or the like contained in the sealing material to form a covalent bond, thereby enabling firm adhesion to the body member. The primer is used in the form of a solution in a solvent. A solvent having low toxicity and capability of evaporating at an appropriate speed is used. In particular, because of a recent problem of VOC (volatile organic compound), an ester-based solvent such as ethyl acetate and butyl acetate is used in place of an aromatic solvent such as toluene and xylene.

As described above, conventional masking tapes have a problem that the pressure-sensitive adhesive composition causes penetration resulting from swelling or dissolution due to the primer treatment and intrudes into a recess part of a porous substrate or a substrate having an uneven surface and the adhesive force is thereby increased. However, the masking tape of this disclosure is prevented from such an increase of the adhesive force and can be easily separated after use. This masking tape can be advantageously used particularly in the architectural usage where a porous substrate or a substrate having an uneven surface, such as concrete, mortar or siding board, is usually employed. However, it should be understood that this disclosure can be applied to any usage in which the effects of this disclosure can be utilized.

EXAMPLES

This disclosure is described below by referring to Examples, but the scope of this disclosure should not be limited to these specific Examples. In Examples, the following abbreviations are used for the description of monomer components and crosslinking agents.

Monomer (a)
2EHA: 2-Ethylhexyl acrylate (AEH, produced by Nippon Kayaku Co., Ltd.)
IBXA: Isobornyl acrylate (LIGHT-ACRYLATE (trademark) IBXA, produced by Kyoeisha Chemical Co., Ltd.)
LMA: Lauryl methacrylate (n-C12) (ACRYESTER LMA, produced by Mitsubishi Rayon Co., Ltd.)
Monomer (b-1) (Linear-Alkyl (Meth)Acrylates))
CA: Cetyl acrylate (n-hexadecyl acrylate) (n-C16) (CA, produced by NOF Corporation)
SA: Stearyl acrylate (n-Octadecyl) (STA, produced by Osaka Organic Chemical Industry Ltd.)
SMA: Stearyl methacrylate (n-Octadecyl) (ACRYESTER SMA, produced by Mitsubishi Rayon Co., Ltd.)
Monomer (b-2) (Branched-Alkyl (Meth)Acrylates)
ICA: Isocetyl acrylate (branched-C16) (HEDA16, produced by Toho Chemical Industrial Co., Ltd.)
ISA: Isostearyl acrylate (branched-C18) (NK ESTER ISA, produced by Shin-Nakamura Chemical Co., Ltd.)

Monomer (c)
DAAM: Diacetone acrylamide (DAAM, produced by Nippon Kasei Chemical Co., Ltd.)
Monomer (d) (i.e., Monomers Other than Monomer (a), Monomer (b) and Monomer (c))
BA: n-Butyl acrylate (Butyl Acrylate, produced by Mitsubishi Chemical Corporation)
AA: Acrylic acid (AA, produced by Toagosei Co., Ltd.)
HEMA: Hydroxyethyl methacrylate (Hydroxyethyl Methacrylate, produced by Wako Pure Chemical Industries, Ltd.)
Internal Crosslinking Agent: HDDA: Hexanediol Diacrylate (LIGHT-ACRYLATE 1,6-HDDA, Produced by Kyoeisha Chemical Co., Ltd.)
External Crosslinking Agent:
ADH: Adipoyl dihydrazide (ADH, produced by Nippon Kasei Chemical Co., Ltd.)
VDH: 1,3-Bis(hydrazinocarbonoethyl)-5-isopropylhydantoin (VDH, produced by Ajinomoto Fine Chemical K.K.)
Synthesis of Polymer (Pressure-Sensitive Adhesive Particle):

A surfactant (NEOPELEX G-15, produced by Kao Corporation) (6.67 g) was added to ion exchanged water to make 100 g. To this aqueous solution, a monomer composition prepared according to the blending amounts shown in Table 1 below was added. The resulting mixture was treated in a homogenizer (manufactured by PRIMIX Corporation) for 15 minutes. Thereafter, the mixture was transferred to a 2 liter-volume glass-made reaction vessel equipped with a stirrer, a condenser and a nitrogen inlet tube and after nitrogen purging, heated with stirring to set the inner temperature to 50° C. Thereto, 0.2 g of azobisvaleronitrile (V-65, produced by Wako Pure Chemical Industries, Ltd.) as a polymerization initiator was added and the polymerization reaction was started. After the reaction for 3 hours, the reaction product was ripened at 65° C. for 2 hours, thereby completing the polymerization. The obtained suspension was almost free of an aggregate and exhibited good storage stability.

In the case of using an internal crosslinking agent, the crosslinking agent is added to the monomer composition and then, the polymerization is performed. In the case of using an external crosslinking agent, after the polymerization is completed and a particulate pressure-sensitive adhesive composition is formed, the crosslinking agent is added.

Preparation of Pressure-Sensitive Adhesive Tape
The suspension synthesized by the above-described method was coated on roll-like resin-impregnated paper (produced by 3M) of 150 mm in width and dried. A tape where the coating film had a thickness of 30 μm after drying was obtained.

Measurement of Adhesive Property to Roughened Surface: The adhesive property to roughened surface was evaluated using sandpaper to resemble a uniformly roughened surface. Sandpaper No. 280 (produced by 3M) was fixed on a plastic plate by using a double-coated adhesive tape such that the abrasive surface of the sandpaper came to the outside. A sample slit into a size of 12 mm in width and 120 mm in length and attached with a hook at one end was affixed to the abrasive surface, and a rubber roller of 2 kg was moved back and forth once thereon. Immediately, the plastic plate was fixed by arranging the tape-affixed surface to face downward and after hanging a weight of 5 g on the hook, the weight was refrained from swinging. The boundary line of separation was marked, and measurement was started using a stopwatch. After leaving the sample to stand for 10 minutes, the time at which the tape was separated to a distance of 100 mm was recorded. If the separation distance of 100 mm was not achieved within 10 minutes, it was recorded as "over 10 minutes". A longer time until separation is better, but a time of 2 seconds or more may be sufficient in practice.

Measurement of Peel Strength: In order to examine fundamental pressure-sensitive adhesive properties, the tape obtained by the above-described method was slit into a size of 12 mm in width and 100 mm in length and affixed to an SUS304 plate (20 mm in width and 120 mm in length), and a rubber roller of 2 kg was moved back and forth once thereon. Subsequently, the peel force when separated to the 90° direction was measured using Tensilon (RTM-100, manufactured by Toyo Baldwin Co., Ltd.) at a tensile speed of 300 mm/min at 25° C. The measurement was performed three times for one sample and the average value of peel forces at respective measurements is shown in Table 2.

High-Speed Separation Test in Use of Primer: A sample slit into a size of 18 mm in width and about 120 mm in length was affixed by hand to the roughened surface of a mortar plate. A primer for sealing, HAMATITE Primer No. 40 (produced by The Yokohama Rubber Co., Ltd.), was coated by a brush on the end face in the longitudinal direction of the sample. The sample was left standing at room temperature for 16 hours and then quickly separated by hand, and the number of tapes causing sample breakage was recorded. Also, the mortar surface after separation was observed with an eye.

Aging Test: A sample slit into a size of 18 mm in width and about 120 mm in length was affixed by hand to the smooth surface of a mortar plate. The sample was left standing in an atmosphere of 65° C. for 16 hours and then separated by hand, and the presence or absence of glue residue or adhesion mark on the adherend was observed with an eye and recorded. The pressure-sensitive adhesive surface of the tape after separation was also observed. The rating was recorded as "A" when absolutely no glue residue was observed on the adherend, as "B" when glue residue was not observed but adhesion mark was faintly observed, as "C" when glue residue was observed only in the edge part, and as "D" when glue residue was observed in the center portion. Samples rated A and B were judged to be usable.

Low-Temperature Tack Test at 5° C.: The test was performed in a room at 5±1° C. Samples and testers all were left standing in a room at 5° C. for 10 minutes or more and then used. A double-coated adhesive tape was adhered to the back surface of the sample, and the double-coated adhesive tape side was affixed to the sample adhering position of a rolling wheel tack tester while inhibiting intrusion of an air bubble. The rolling wheel was wiped with methyl ethyl ketone (MEK) and then with hexane and set on the tester. The wheel was rolled by slowly lifting the stopper and the position at which the wheel stopped was marked. The wheel was slowly moved while pressing the wheel by hand, and the position at which the wheel first came into contact with the sample was marked. The distance between two marked points was measured and recorded as "A" when from 0 to 49 mm, as "B" when from 50 to 300 mm, and as "C" when 300 mm or more. A shorter distance indicates a greater tack.

Measurement of Dynamic Viscoelasticity: Dynamic viscoelastic properties were measured using Advanced Rheometric Expansion System (ARES) manufactured by Rheometric Scientific in a shear mode at a frequency of 1.0 Hz, and the storage modulus G' (Pa) at a temperature of 5° C., the glass transition temperature (the maximum value of loss tangent (tan δ) at a frequency of 1.0 Hz), and the loss tangent (tan δ) at a temperature of 100° C. were determined.

The preferred viscoelastic properties are that:
(i) the value of shear storage modulus G' at 5° C. is 10.0 MPa or less and if the value exceeds this range, tack tends to be excessively weak;
(ii) if the glass transition temperature is 30° C. or more, the adhesive force becomes too high and glue residue sometimes occurs at the separation; and
(iii) the value of loss tangent at 100° C. is from 0.10 to 0.3 and if the value is less than 0.1, wet spreading is difficult, whereas if it exceeds 0.3, the molecular weight of the polymer is not sufficiently large and a cohesive force can be hardly obtained.

TABLE 1

Monomer Compositions

| Ex. No. | (d) BA | (a) 2EHA | (a) IBXA | (a) LMA | (b-1) linear CA | (b-1) linear SA | (b-1) linear SMA | (b-2) branched ICA | (b-2) branched ISA | (c) DAAM | (d) AA | (d) HEMA | internal cross-linking HDDA | external cross-linking agent ADH | external cross-linking agent VDH |
|---|---|---|---|---|---|---|---|---|---|---|---|---|---|---|---|
| Ex 1 | | 53 | | | | 45 | | | | 2 | | | | | |
| Ex 2 | | 63 | | | | 35 | | | | 2 | | | | | |
| Ex 3 | | 73 | | | | 25 | | | | 2 | | | | | |
| Ex 4 | | 63 | | | | 30 | | | 5 | 2 | | | | | |
| Ex 5 | | 63 | | | | 30 | | | 5 | 2 | | | | 0.025 | |
| Ex 6 | | 63 | | | | 30 | | | 5 | 2 | | | | 0.05 | |
| Ex 7 | | 63 | | | | 30 | | | 5 | 2 | | | | | 0.05 |
| Ex 8 | | 63 | | | | 30 | | | 5 | 2 | | | 0.025 | | |
| Ex 9 | | 63 | | | | 30 | | | 5 | 2 | | | 0.05 | | |
| Ex 10 | | 63 | | | | 30 | | | 5 | 2 | | | 0.1 | | |
| Ex 11 | | 60 | | | | 25 | | | 10 | 5 | | | | 0.05 | |
| Ex 12 | | 64 | | | | 30 | | | 5 | 1 | | | | 0.05 | |
| Ex 13 | | 63 | | | | 25 | | 10 | | 2 | | | | 0.05 | 0.05 |
| Ex 14 | | 68 | | | | | | 30 | | 2 | | | | 0.05 | |
| Ex 15 | | 68 | | 30 | | | | | | 2 | | | 0.025 | | |
| Ex 16 | | | 20 | | | | | | 80 | 2 | | | 0.025 | | |
| Ex 17 | | 63 | | | | 30 | | | 5 | 2 | 0.5 | | | 0.05 | |
| Ex 18 | | 63 | | | | 30 | | | 5 | 2 | | 0.5 | | 0.05 | |

TABLE 1-continued

| | Monomer Compositions | | | | | | | | | | | | | internal cross-linking agent | external cross-linking agent | external cross-linking agent |
|---|---|---|---|---|---|---|---|---|---|---|---|---|---|---|---|---|
| Ex. No. | (d) BA | (a) 2EHA | (a) IBXA | (a) LMA | (b-1) linear CA | (b-1) linear SA | (b-1) linear SMA | (b-2) branched ICA | (b-2) branched ISA | (c) DAAM | (d) AA | (d) HEMA | HDDA | ADH | VDH |
| CE 1 | | 43 | | | | 55 | | | | 2 | | | | | |
| CE 2 | | 83 | | | | 15 | | | | 2 | | | | | |
| CE 3 | | 98 | | | | | | | | 2 | | | | 0.05 | |
| CE 4 | | | | 98 | | | | | | 2 | | | | | |
| CE 5 | 63 | | | | | 35 | | | | 2 | | | 0.025 | | |

TABLE 2

Experimental Results

| No. | Peel Strength (N/12 mm) | High-speed separation test after primer treatment | Aging test | *Adhesive property to rough surface | Low temperature tack at 5° C. | Glass Transition Tem. (° C.) | G' at 5° C. (MPa) | tanδ at 100° C. |
|---|---|---|---|---|---|---|---|---|
| Ex 1 | 1.9 | breakage in 0 tape out of 3 tapes | A | 30 s | B | −31 | 0.77 | 0.22 |
| Ex 2 | 2.2 | breakage in 0 tape out of 3 tapes | B | Over 10 m | A | −38 | 0.059 | 0.24 |
| Ex 3 | 1.5 | breakage in 0 tape out of 3 tapes | B | 5 m 30 s | A | −42 | 0.034 | 0.24 |
| Ex 4 | 1.6 | breakage in 0 tape out of 3 tapes | B | 30 s | A | −40 | 0.024 | 0.25 |
| Ex 5 | 1.5 | breakage in 0 tape out of 3 tapes | A | 8 m | A | −40 | 0.024 | 0.22 |
| Ex 6 | 1.6 | breakage in 0 tape out of 3 tapes | A | 18 s | A | −40 | 0.024 | 0.21 |
| Ex 7 | 1.6 | breakage in 0 tape out of 3 tapes | A | 20 s | A | −40 | 0.03 | 0.20 |
| Ex 8 | 1.5 | breakage in 0 tape out of 3 tapes | A | Over 10 m | A | −40 | 0.023 | 0.21 |
| Ex 9 | 1.4 | breakage in 0 tape out of 3 tapes | A | 2 m | A | −40 | 0.024 | 0.20 |
| Ex 10 | 1.1 | breakage in 0 tape out of 3 tapes | A | 10 s | A | −40 | 0.028 | 0.16 |
| Ex 11 | 1.6 | breakage in 0 tape out of 3 tapes | A | 30 s | A | −40 | 0.024 | 0.21 |
| Ex 12 | 1.5 | breakage in 0 tape out of 3 tapes | A | Over 10 m | A | −40 | 0.023 | 0.21 |
| Ex 13 | 1.4 | breakage in 0 tape out of 3 tapes | A | 2 m | A | −40 | 0.024 | 0.20 |
| Ex 14 | 1.6 | breakage in 0 tape out of 3 tapes | B | 5 s | A | −31 | 0.042 | 0.24 |
| Ex 15 | 1.0 | breakage in 0 tape out of 3 tapes | B | 3 s | A | −40 | 0.033 | 0.23 |
| Ex 16 | 1.9 | breakage in 0 tape out of 3 tapes | B | 5 s | A | −40 | 0.025 | 0.23 |
| Ex 17 | 1.5 | breakage in 0 tape out of 3 tapes | A | 5 s | A | −40 | 0.024 | 0.23 |
| Ex 18 | 1.4 | breakage in 0 tape out of 3 tapes | A | 5 s | A | −40 | 0.024 | 0.23 |
| CE 1 | 1.25 | breakage in 0 tape out of 3 tapes | B | 1 s | C | −24 | 8.7 | 0.23 |
| CE 2 | 1.8 | breakage in 2 tapes out of 3 tapes, adhered only in edge part | B | 45 s | A | −46 | 0.04 | 0.23 |
| CE 3 | 1.9 | glue residue | C | 1 s | A | −45 | 0.047 | 0.23 |
| CE 4 | 2.4 | breakage in 3 tapes out of 3 tapes | D | 2 m | C | −12 | 0.07 | 0.20 |
| CE 5 | 1.1 | breakage in 3 tapes out of 3 tapes | A | 1 s | B | −40 | 0.024 | 0.17 |

* s = seconds; m = minutes

What is claimed is:

1. A pressure-sensitive adhesive composition comprising (A) a particulate polymer of a monomer mixture comprising:
   from 20 to 55 mass % of (a) an alkyl (meth)acrylate monomer with an alkyl group having a carbon number of 8 to 14,
   from 20 to 35 mass % of (b-1) an alkyl (meth)acrylate monomer with an alkyl group having a carbon number of 15 to 24 wherein the alkyl group is a linear alkyl group,
   from 5 to 35 mass % of (b-2) an alkyl (meth)acrylate monomer with an alkyl group having a carbon number of 15 to 24 wherein the alkyl group is a branched alkyl group, and
   from 2 to 5 mass % of (c) a monoolefinically unsaturated monomer having a ketone group,
   said percentages each being based on the total amount of the monomers (a), (b-1), (b-2), and (c),
   wherein the monomer mixture is polymerized in the presence of water; and
   (B) an initiator having low solubility in water.

2. The pressure-sensitive adhesive composition of claim 1 wherein monomer (a) is selected from the group consisting of 2-ethylhexyl (meth)acrylate, isooctyl (meth)acrylate, isononyl (meth)acrylate, isodecyl (meth)acrylate and isobornyl (meth)acrylate.

3. The pressure-sensitive adhesive composition of claim 1 wherein monomer (b-1) is selected from the group consisting of cetyl (meth)acrylate and stearyl (meth)acrylate.

4. The pressure-sensitive adhesive composition of claim 1 wherein monomer (b-2) is selected from the group consisting of alkyl (meth)acrylate monomer with the alkyl group having a carbon number of 16 or 18.

5. The pressure-sensitive adhesive composition of claim 1 wherein monomer (c) is selected from the group consisting of diacetone (meth)acrylamide, acryloylbenzophenone, vinyl methyl ketone, vinyl ethyl ketone and vinyl isobutyl ketone.

6. The pressure-sensitive adhesive composition of claim 5 wherein monomer (c) is diacetone (meth)acrylamide.

7. The pressure-sensitive adhesive composition of claim 1 wherein the particle polymer of a monomer mixture (A) further comprises 0.1 to 0.5 mass % of an internal crosslinking agent based on the total mass of the monomers (a), (b-1), (b-2), (c) and the internal crosslinking agent.

8. The pressure-sensitive adhesive composition of claim 7 wherein the internal crosslinking agent is a (meth)acrylic acid ester of diol.

9. The pressure-sensitive adhesive composition of claim 1 wherein the particle polymer of a monomer mixture (A) further comprises an external crosslinking agent.

10. The pressure-sensitive adhesive composition of claim 1 wherein the particle polymer of a monomer mixture (A) further comprises 0.1 to 0.5 mass % of an internal crosslinking agent, wherein the percentage of the internal crosslinking agent is based on the total mass of the monomers (a), (b-1), (b-2), (c), and the internal crosslinking agent; and an external crosslinking agent.

11. A layer of the pressure-sensitive adhesive composition of claim 1 wherein a thickness of the adhesive layer ranges from 3 μm to 150 μm.

* * * * *

UNITED STATES PATENT AND TRADEMARK OFFICE
CERTIFICATE OF CORRECTION

PATENT NO. : 9,909,036 B2
APPLICATION NO. : 15/298022
DATED : March 6, 2018
INVENTOR(S) : Jun Fujita et al.

Page 1 of 1

It is certified that error appears in the above-identified patent and that said Letters Patent is hereby corrected as shown below:

In the Specification

Column 1
Line 45, delete "$4\times10^5$" and insert -- $4\times10^6$ --

Column 2
Line 59, Delete "R "is" and insert -- R" is --,
Line 63, "B+the" and insert -- B + the --

Column 11
Line 56, delete "Acrylates))" and insert -- Acrylates) --

Signed and Sealed this
Twenty-first Day of August, 2018

Andrei Iancu
*Director of the United States Patent and Trademark Office*